US011113750B2

(12) United States Patent
Dixon et al.

(10) Patent No.: US 11,113,750 B2
(45) Date of Patent: *Sep. 7, 2021

(54) SYSTEM AND METHOD FOR ELECTRONIC MANIFESTING IN A DISTRIBUTION NETWORK

(71) Applicant: United States Postal Service, Washington, DC (US)

(72) Inventors: Robert E. Dixon, Haymarket, VA (US); Kelley A. Sullivan, Washington, DC (US)

(73) Assignee: United States Postal Service, Washington, DC (US)

( * ) Notice: Subject to any disclaimer, the term of this patent is extended or adjusted under 35 U.S.C. 154(b) by 99 days.

This patent is subject to a terminal disclaimer.

(21) Appl. No.: 16/353,953

(22) Filed: Mar. 14, 2019

(65) Prior Publication Data

US 2019/0251617 A1 Aug. 15, 2019

Related U.S. Application Data

(63) Continuation of application No. 14/944,029, filed on Nov. 17, 2015, now Pat. No. 10,248,988.

(60) Provisional application No. 62/080,874, filed on Nov. 17, 2014.

(51) Int. Cl.
*G06Q 30/06* (2012.01)
*G06Q 10/08* (2012.01)
*B07C 7/00* (2006.01)

(52) U.S. Cl.
CPC ..... *G06Q 30/0635* (2013.01); *G06Q 10/0833* (2013.01); *B07C 7/005* (2013.01)

(58) Field of Classification Search
CPC ............ G06Q 30/0635; G06Q 10/0833; B07C 7/005; B07C 2301/00
USPC ...................................................... 705/26.81
See application file for complete search history.

(56) References Cited

U.S. PATENT DOCUMENTS

| 5,712,787 | A | * | 1/1998 | Yeung | ................ | G06Q 30/0201 700/227 |
| 6,182,565 | B1 | | 2/2001 | Takayama et al. | | |
| 7,827,118 | B1 | * | 11/2010 | Smith, III | ............ | G06Q 10/025 705/333 |
| 2005/0075997 | A1 | | 4/2005 | Rainey et al. | | |
| 2005/0139323 | A1 | | 6/2005 | Syde et al. | | |
| 2005/0259658 | A1 | * | 11/2005 | Logan | ................... | H04L 67/306 370/392 |
| 2008/0133659 | A1 | * | 6/2008 | Aldrey | .................. | G06Q 10/08 709/204 |

(Continued)

FOREIGN PATENT DOCUMENTS

WO  WO 2011/009003 A1  1/2011

*Primary Examiner* — Yogesh C Garg
(74) *Attorney, Agent, or Firm* — Knobbe Martens Olson & Bear LLP

(57) ABSTRACT

System and method for providing electronic manifesting access for users of a distribution network. A distribution network may provide a user access point, such as by providing application programming interfaces. The access point may provide access the item tracking module upon receipt of valid credentials, such as a user's unique identifier. The access point may receive item information, generate an electronic manifest including the item information and the unique identifier, and allow for tracking the items on the electronic manifest.

16 Claims, 3 Drawing Sheets

(56) References Cited

U.S. PATENT DOCUMENTS

| | | | |
|---|---|---|---|
| 2010/0057593 A1* | 3/2010 | Moir | G01G 19/415 |
| | | | 705/29 |
| 2014/0360141 A1 | 12/2014 | Willard, III et al. | |
| 2014/0374478 A1* | 12/2014 | Dearing | G06Q 50/32 |
| | | | 235/385 |
| 2015/0220879 A1 | 8/2015 | Dearing et al. | |
| 2016/0140486 A1* | 5/2016 | Tibbs | G06Q 10/08355 |
| | | | 705/330 |

* cited by examiner

SYSTEM AND METHOD FOR ELECTRONIC MANIFESTING IN A DISTRIBUTION NETWORK

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application is a continuation of U.S. application Ser. No. 14/944,029, filed Nov. 17, 2015, which, in turn, claims the benefit of priority to U.S. Provisional Application No. 62/080,874, filed Nov. 17, 2014.

BACKGROUND

Field

This disclosure relates to providing electronic manifesting capability for a distribution network.

Description of the Related Technology

A distribution network may have many items in process or transit at any time. In some instances a distribution network will be responsible for inducting an item into the distribution process, collecting payment for the transportation of the item based on certain parameters (e.g. original/destination location; item weight; item dimensions), tracking the item throughout the distribution process and, if necessary, revising the data associated with the item (e.g. destination location and payment information). When executed manually, this process can be labor intensive and prone to human error. Automating the process for identifying an item, facilitating payment for an item, tracking an item and revising the destination or other data associated with an item, can enable a distribution network to realize benefits including, increases in efficiency and improvements in accounting accuracy. Generally, when a sender desires to send an item, the item is provided to the distribution network. When the item is onboarded or taken into the distribution network, the network needs to identify the item. This can be done manually or using optical character recognition (OCR), or other resource intensive identification techniques. After identifying the item, the distribution network can then produce a unique, machine readable identifier for the item, which is used for handling events and tracking the item throughout the distribution network. If the sender had access to the distribution network's information systems, the sender could identify the item to the distribution network and provide item identification directly on the item as well as electronically to the distribution network's information systems. Allowing the sender to access the distribution networks information systems would also enable the sender to remit payment for the services to be provided by the distribution network. For the distribution network, providing senders access to information systems would eliminate the need for the distribution network to identify the item at the point of induction, reducing labor costs and costs resulting from human error and payment fraud. For senders, this access may speed up and reduce the resources required to identify and remit payment for items inducted into the distribution network, as well as facilitate any changes to the item once it is inducted. A shipper or user may desire or be granted secure access to a distribution network's systems of record enabling a shipper to electronically manifest shipping label data to said records and initiate postage payment via a scanning device scan at the point of inducting an item (e.g. a package) into the distribution process.

SUMMARY OF THE INVENTION

In one aspect, a method of manifesting items comprises providing a user access point, the user access point providing access to an item tracking module; receiving, via the user access point, an access request to access the item tracking module; assigning, by a processor, a unique identifier associated with a user; storing, by a processor, the unique identifier in the item tracking module; providing, using a processor, based on the access request, access to the item tracking module; receiving, via the user interface, item information for one or more items; generating a unique identifier for at least one of the one or more items; associating, in the item tracking module, the unique identifier for at least one or more items with the user's unique identifier; creating, by a processor, an electronic manifest including the item information and the user's unique identifier; and providing, by a processor, item tracking information for items on the electronic manifest via the user access point. In another aspect, the method includes providing, the amount of payment due for at least one or more items, requesting by a processor, associating and storing payment due with the unique identifier for at least one or more items by a processor, initiating a payment process via a scanning device at the point of induction, securely accessing the user's payment information via the user's unique identifier, remitting payment for at least one or more items by a processor to the distribution network.

In some embodiments, the method further comprises generating label information for at least one of the items on the electronic manifest.

In some embodiments, the method further comprises providing the label information via the user access point.

In some embodiments, the label information is provided via the user access point such that a physical label can be generated for at least one item on the electronic manifest.

In some embodiments, the method further comprises providing electronic manifest information to a payment module.

In some embodiments, the method further comprises updating the electronic manifest upon receipt of payment for one or more of the items.

In some embodiments, providing a user access point comprises providing an application programming interface comprising instructions for accessing the item tracking module.

In some embodiments, receiving the access request comprises receiving, via the user access point, an access request generated by a user-created user interface.

In some embodiments, the method further comprises providing a user access to the item tracking module comprises authenticating a user based at least on the user's unique identifier.

In another aspect, a system of manifesting items comprises a user access point configured to receive an access request to access an item tracking module, and configured to provide electronic access to an item tracking module; wherein the item tracking module is configured to: generate and store a unique identifier, the unique identifier associated with a user; receive item information for one or more items; generate and store a unique identifier for at least one of the one or more items; associate the unique identifier for at least one of the one or more items with the user's unique identifier; and generate an electronic manifest including the item information and the user's unique identifier.

In some embodiments, the user access point is further configured to provide item tracking information for items on the electronic manifest.

In some embodiments, the item tracking module is further configured to generate label information for at least one of the items on the electronic manifest.

In some embodiments, the user access point is further configured to receive the label information from the item tracking module.

In some embodiments, the user access point is further configured to provide label information to a user such that the user can generate a physical label for at least one item on the electronic manifest.

In some embodiments, the system further comprises a payment module configured to receive electronic manifest information and associate the electronic manifest information with a payment account.

In some embodiments, the payment module is further configured to update the electronic manifest upon receipt of payment for one or more of the items from the payment account.

In some embodiments, the user access point comprises one or more application programming interfaces comprising instructions for accessing the item tracking module.

In some embodiments, the user access point is configured to receive an access request generated by a user-created user interface according to the one or more application programming interfaces.

In some embodiments, the user access point is configured to authenticate a user based at least on the user's unique identifier.

DETAILED DESCRIPTION

The following detailed description is directed to certain specific embodiments of the development. In this description, reference is made to the drawings wherein like parts or steps may be designated with like numerals throughout for clarity. Reference in this specification to "one embodiment," "an embodiment," or "in some embodiments" means that a particular feature, structure, or characteristic described in connection with the embodiment is included in at least one embodiment of the invention. The appearances of the phrases "one embodiment," "an embodiment," or "in some embodiments" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The present disclosure describes an electronic manifesting system which is operated, controlled, and/or maintained by a distribution network. The distribution network stores large amounts of data regarding the items within the distribution network, including tracking of items. The electronic manifesting system described herein allows access by third parties, such as retailers, customers, and the like to access an electronic manifesting system to take advantage of the distribution network's resources. By having access to an electronic manifesting system, a user, such as a retailer, shipper, or customer can save time and costs in its shipping activities. For example, a shipper or sender of an item can provide manifest information, including item identification to the distribution network and physical identifiers to place on the item, thus saving time and resources, and improving the efficiency and reliability of the distribution network. Further, electronic manifesting can provide access to various payment systems for paying the costs of distribution within the distribution network.

Figure 1:
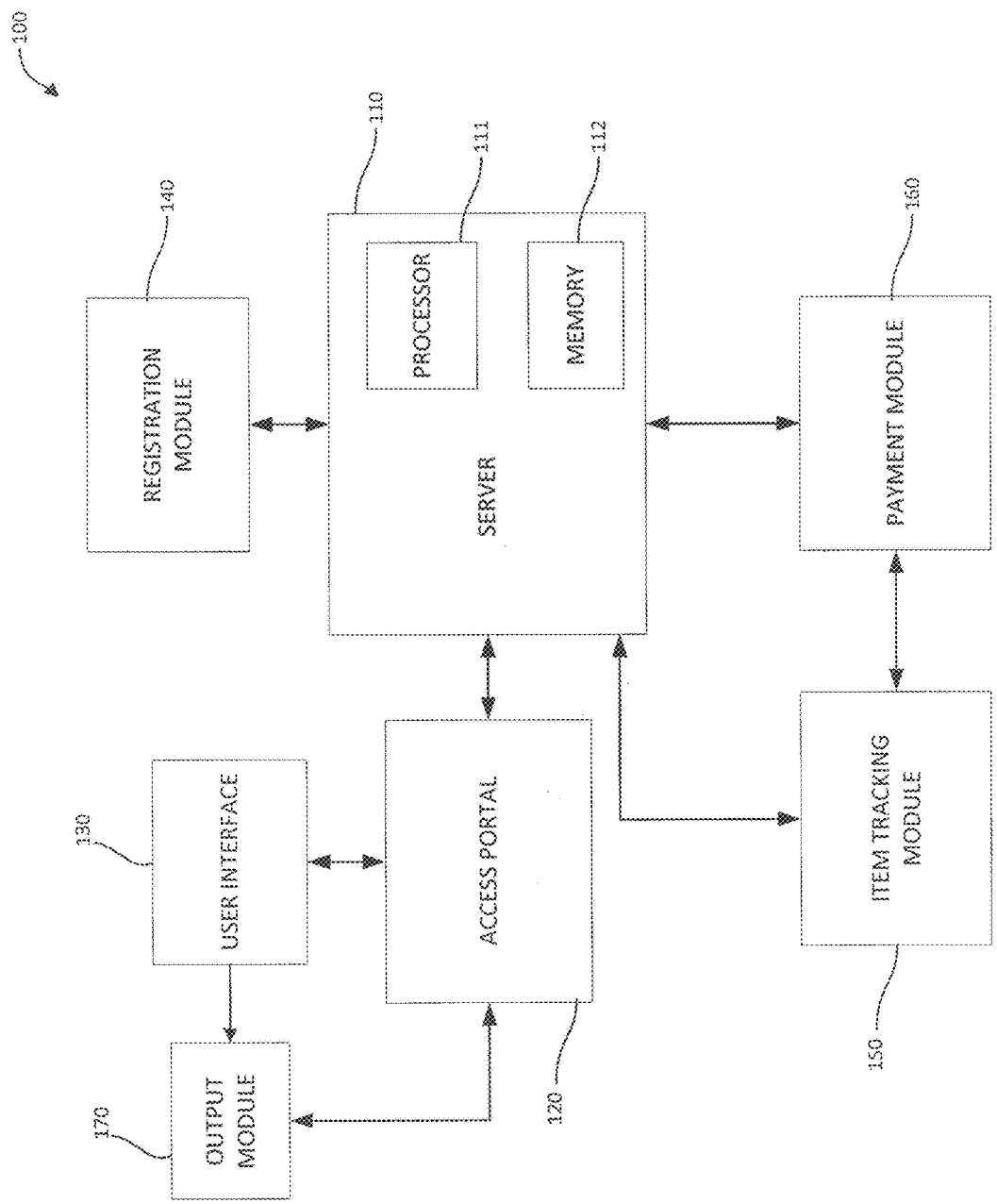
FIG. 1 is a block diagram of an embodiment of an electronic manifesting system.

FIG. 1 depicts a block diagram of a system for electronic manifesting. An electronic manifesting system 100 comprises a server 110, an access portal 120, a user interface 130, a registration module 140, an item tracking module 150, a payment portal 160, and an output module 170.

The server 110 comprises a processor 111 and a memory 112. The processor 111 may be implemented as hardware as part of a dedicated server or computer. The processor 111 directs the operation of the server, including the interface and communication of the server 110 with the various other components of system 100. The memory 112 can store instructions for directing processor 111 and various other components of the system 100. The memory 112 can also store information in memory which is available for access to other components of system 100. For example, memory 100 may store information obtained from a user via the access portal 120.

The access portal 120 may be a user access point, whereby a user is provided access to the server 110 and other components of the system 100. In some embodiments, the access portal 120 can be embodied in software running on the server 110, or can be running on a separate processor or stand-alone computer in communication with the server 110. In some embodiments, the application portal may be an internet, web, or network gateway which allows access to programs, memories, and components of the system 100. In some embodiments, the access portal 120 comprises an architecture and one or more application programming interfaces (APIs) which describe or provide communication protocols or instructions between the user interface 130, the access portal 120, and the other components of the system 100. The APIs may provide developer instructions such that a developer, customer, retailer, or other entity can customize or tailor the user interface 130 to each entity's needs or requirements. The APIs may provide access for a small business or retailer to an electronic manifesting program. The electronic manifest and APIs may have software and/or other requirements similar to those described in United States Postal Service Publication 205, "Electronic Verification System (eVS®) Business and Technical Guide" dated Nov. 8, 2013, and United States Postal Service Publication 199, "Intelligent mail Package Barcode (IMpb) Implementation Guide for: Confirmation Services and Electronic system (eVS) Mailers, dated Sep. 16, 2013, the contents of which are hereby incorporated by reference in their entirety.

The user interface 130 provides a user the ability to interact with the server 110 via the access portal 120. The user interface 130 comprises an electronic interface. The user interface 130 may be an internet browser which a user points to a particular website. In some embodiments, the user interface 130 may be a mobile application. The mobile application may be stored and/or accessed from a smart phone, personal digital assistant, tablet computer, laptop computer, or other mobile communication device. The user interface 130 is configured to interface or communicate with the server 110 via a wired or wireless communication method. Where the user interface 130 is available on a smart phone or other mobile communication device, the interface between the application 110 and the server 120 may advantageously be via a cellular network, a wireless fidelity network using an IEEE 802.11x protocol, a Bluetooth connection, or any other desired wireless communication method. In some embodiments, the user interface 130 may be useable by an individual through selecting options, features, and/or functions, inputting data, and requesting information. In some embodiments, the user interface 130 may be an automated program or routine which automatically inputs information regarding an item from a retailer's computer network, online sales website, or other similar functionality into the system 100.

The user interface 130 may be programmed and maintained by a distribution entity who also controls the other components of the system 100. The user interface 130 can be programmed by a third party (i.e., a party other than the distribution network) or by a frequent user of the distribution network. The third party can program, develop, write, or customize the user interface 130 to suit its own needs. By using the APIs provided by the distribution network, the third party can develop the user interface 130 which can communicate with the system 100 via the access portal 120. In some embodiments, the access portal 120 may interface with multiple user interfaces 130, which may be created by multiple entities, and each user interface 130 can have access to the server 110 via the access portal 120. The access portal 120 and APIs are configured to allow multiple users access to the registration module 140, the item tracking module 150, and the payment system 160. The APIs and the access portal 120 allow a sender, or any desired party, to access the components of the system 100 in order to provide item manifesting and tracking capabilities. The APIs instruct a developer how to write, code, structure, or otherwise create the user interface 130 in order to provide access to the components of the system 100. In some embodiments, the distribution network may provide a standardized user interface 130. In some embodiments, the distribution network may provide a customizable user interface 130. In some embodiments, a sender may create the user interface 130 based on the user's needs. The user may receive, via the user interface, access to information and services provided by the distribution network described herein. The access portal 120 is configured to interface with multiple, different user interfaces prepared by different and various users. The APIs can create a "sandbox" environment where users, senders, or developers can access the system 100 and use the information and services of the distribution network in a variety of different ways. By accessing the system 100 via the access portal 120, the user interface 130 can access the information in the memory 112, and use and manipulate the information by the user interface 130 without affecting the original information in the memory 112.

The registration module 140 is configured to receive registration, login, and other access data, store registration status, and grant or deny permission to access components of the system 100. The registration module 140 may be embodied as a routine, such as software or firmware housed on the server 110. In some embodiments, the registration module 140 is a standalone processor or computer in wired or wireless communication with the server 110. The registration module 140 may comprise a memory and a processor. In some embodiments, the registration module 140 may access an external or central memory, such as memory 112. The registration module is configured to interface with the server and to provide registration and login functionality to the user interface 130 via the access portal 120.

The registration module 140 receives and stores registration and login information when an entity initially signs up or requests a registration to use an electronic manifesting service, such as system 100. The registration module 140 contains instructions to guide a potential registrant to input appropriate information to establish an account or to grant access. In some embodiments, for example, an entity, or new electronic manifesting customer accesses the access portal 130 via the user interface 140. The server 110 communicates with the registration module 140, or the registration module may communicate directly through the access portal 130. The registration module 140 requests that and receives information such as name, address, and any other desired information. In some embodiments, the registration module 140 requests an entity agree to terms or sign an agreement in order to have access to the system 100. The registration module 140 may gather payment or account information from a user who registers with the system 100, and the payment information can be transmitted to the payment portal 160. The payment portal 160 will be described in greater detail below.

The registration module 140 may request authentication or verification information to verify the identity of an entity who requests access to the system 100. If the registration module verifies the identity of a requester, the registration module generates and stores credentials associated with the entity requesting access. Upon subsequent requests for access by the same entity, the registration module 140 receives the access request and the user's credentials, and verifies the credentials based on the stored credentials, and determines to grant access based on the credentials.

In some embodiments, the registration module 140, as part of a registration process for a requesting entity, requests a payment to sign-up or register with the system. The registration module 140 may communicate with the payment module 160 via the server 110 or directly. The registration module 140 may request a payment from a specific entity prior to granting access to the system 100, and may request a payment or a confirmation of payment from the payment module 160. Upon receiving a payment or confirmation of payment from the payment module 160, the registration module 140 may continue with a registration request, or grant access to the system 100.

The registration module 140 is further configured to grant access to the system 100 to entities, customers, and users who have completed initial registration. When an entity, customer, or user completes an initial registration, the registration module 140 stores login information which is associated with stored entity or customer profiles, created at the time of registration. If a user meets the system 100 requirements for establishing an account or service, the registration module 140 identifies an entity or customer profile as being eligible and authorized to access the system 100.

Upon completion of initial registration, the registration module 140 creates or assigns a unique identifier to the entity or customer. The unique identifier can be used to identify a particular sending entity when the entity manifests items through the electronic manifesting system. The unique identifier can be printed or otherwise output on the output module 170, and affixed, added, or printed directly on items manifested through the system 100. The registration module 140 stores the unique identifier for use with each item manifested by the registered entity, customer, or user. The APIs provided by the distribution network may include instructions or protocols on interfacing an output module 170, such as a postal printer, with the access portal 120 such that electronic manifest information, such as postage, addresses, and other information can be printed or affixed to items automatically as the items are electronically manifested. This operation will be described in greater detail below.

The item tracking module 150 may be embodied as a routine, such as software or firmware housed on the server 110. In some embodiments, the item tracking module 150 is a standalone processor or computer in wired or wireless communication with the server 110. The item tracking module 150 may comprise a memory and a processor. In some embodiments, the item tracking module 150 may access an external or other memory, such as memory 112.

The item tracking module 150 comprises or accesses a dedicated item tracking memory, or accesses a memory such as a centralized database housed in memory 112, or in another location. The memory stores handling information for each handling event occurring within the distribution network. In some embodiments, the item tracking module receives data from scans or reads of unique identifiers on each item within the distribution network. Upon scanning or reading each unique identifier, such as a barcode, the item tracking module 150 stores in memory information regarding the scanning or reading of each unique identifier, which may be termed handling events. In some embodiments, the item tracking module 150 stores in memory handling event data for all barcoded items in the distribution network. The handling events occur at each stage of the distribution network from acceptance through to delivery.

The item tracking module 150 is also configured to communicate or interface with the payment portal 160. The item tracking module 150 may directly communicate with the payment portal 160, or it may communicate via the server 110.

The item tracking module 150 is configured to receive the unique identifier created by the registration module 140. This allows the item tracking module 150 to recognize, identify, and associate items having an entity's unique identifier with the entity and the entity's profile throughout the system 100. The item tracking module 150 is further configured to provide unique identifiers for each item which an entity submits for manifesting. The unique identifier for each item may be stored in a memory, such as memory 112, and may be transmitted to the output module 170. In some embodiments, the unique item identifier includes the entity's unique identifier obtained during or after registration. For example, the item tracking module 150 can generate a barcode unique to each item which includes a portion which encodes the entity's unique identifier. Another portion of the barcode can encode a unique identifier specific to the item. In some embodiments, the unique item identifier may encode additional information such as a service code, a destination code, and any other desired code. In some embodiments, the unique identifier may be an Intelligent Mail Barcode™, such as those used by the United States Postal Service. The process of providing unique identifiers for each item will be described in greater detail below.

The payment module 160 may be embodied similar to the other modules described herein. The payment module 160 is configured to receive payment instructions from an entity using the user interface 130 or from the registration module 140 based on information provided by the registered or registering entity. During registration, or at any time after registration, an entity can provide payment information or instructions for the distribution of the entity's items throughout the distribution network. In some embodiments, a registering entity can set up or provide information regarding a trust or permit account, wherein the entity establishes an initial balance in the trust or permit account, and permits access to the distribution network to deduct the cost of distributing the entity's items from the trust or permit account. In some embodiments, the registering entity can establish a debit account wherein the entity provides permission and/or access for the payment module 160 to deduct funds from a bank or other account as needed to pay for distributing the entity's items.

The output module 170 may be embodied similar to the other modules described herein. In some embodiments, the output module 170 is a printer in communication with the user interface 130, which can print reports, labels, manifests, and any other desired output. In some embodiments the output module 170 is embodied in an item sorting apparatus. The output module 170 may receive label or manifest information from the system 100, and be configured to automatically print, emboss, affix, or attach a unique identifier generated by the item tracking module 150 for each item as it is processed by the item sorting apparatus. In some embodiments, the output module 170 may generate an electronic notification of the item, the item's unique identifier, the item's destination, and any other desired information. In some embodiments the output module may be an API or a data stream. Through the user interface, a user may void a transaction that has not yet been manifested and sent to the Item Tracking Module (i.e. the system generates the Shipping Services file manifest at the end of the day. A Mailer may create a label at noon and void it at 4 pm before it ever gets submitted to PTR). In some embodiments, the process of manifesting the item may trigger the generation of electronic postmark to provide additional security and tracking capabilities for the transaction. The registration module may be embodied as a federated identity system (IVS) or centralized enterprise vendor database (Cust Reg). When items move through the distribution network, the label on the item may be scanned and the code may be used to validate that the item was shipped at the reported time and that the item is not using an inappropriate duplicated label. The system may use cryptography to secure information about the user, the item, the manifest, and the code. The cryptography may be provided by software or hardware device.

Figure 2:
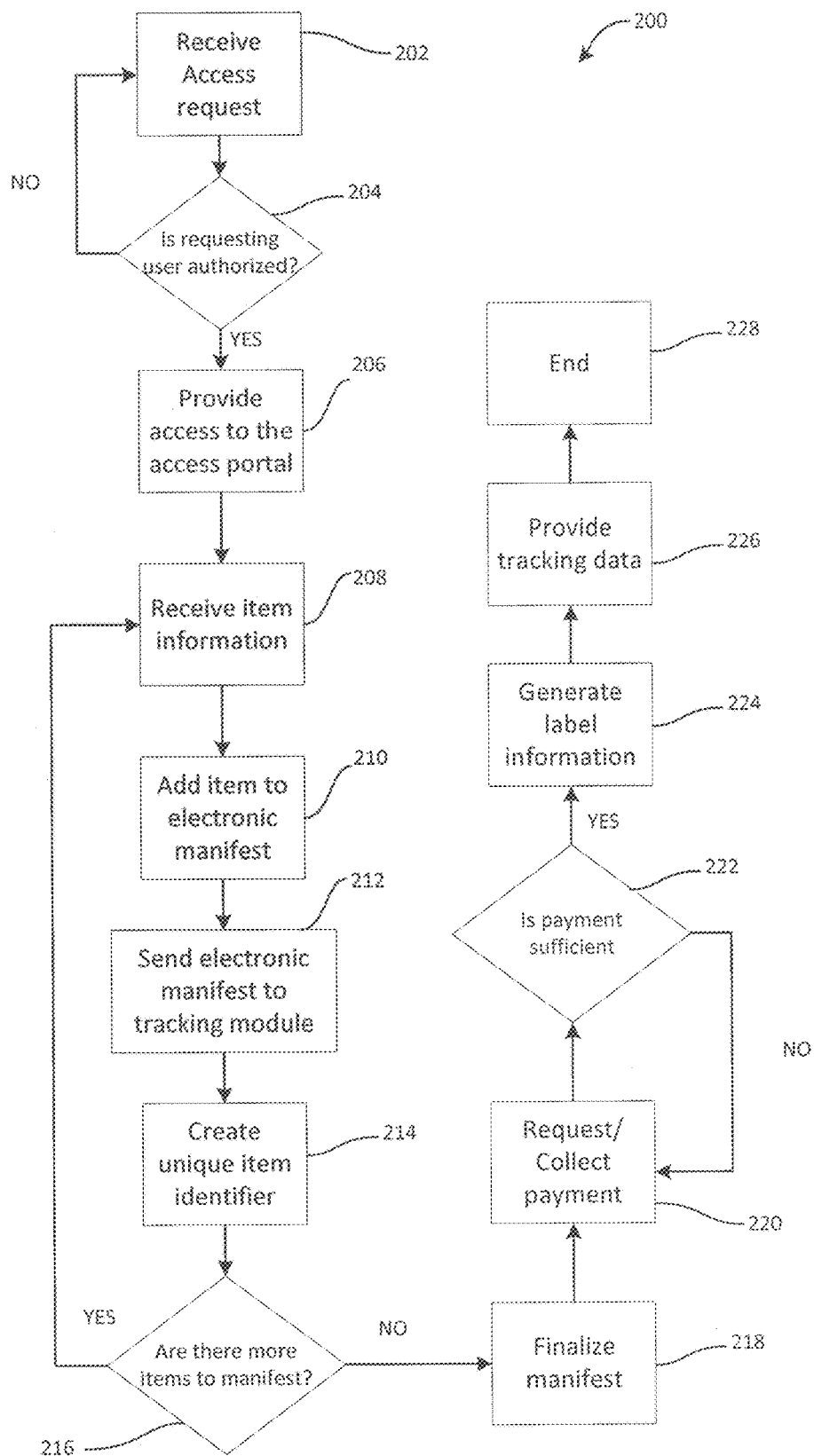
FIG. 2 is flow chart illustrating a method of electronically manifesting an item in the electronic manifesting system.

FIG. 2 depicts an embodiment of a method of manifesting an item using the system 100. The process 200 begins in block 202 where the system 100 receives a request for access via the user interface 130. A request may be made by an entity, customer, or user via a mobile application, a web browser, a dedicated client interface, an internet connected device, or any other desired interface. The user requests access by providing credentials, such as a login, an electronic verification, or a digital certificate.

Upon receiving the user's credentials, the process 200 moves to decision state 204, wherein the system 100 determines whether the requesting user is authorized to access the system 100. The server 110 may provide the credentials to the registration module 140. If the credentials are not recognized or are incorrect, the process 200 returns to block 202. If the credentials match an existing profile, or match stored credential information, the registration module 140 provides a confirmation that the user is permitted access, and the process 200 moves to block 206, wherein access is provided to the system 100.

Upon providing access to the system 100 in block 206, the process moves to block 208, wherein the user interface requests and receives item information. The user interface may be structured to prompt a user to input item information such as item identification, size, weight, dimensions, customer identifier, origin, destination, special handling instructions, item value, recipient contact information, delivery confirmation instructions, sender contact information, shipper contact information, and the like. In some embodiments, the item information may be provided via user interface using an automated system. For example, a retailer may maintain a purchasing and shipping system which customers use to buy items and request and pay for delivery. The retailer can collect sales and delivery information for various items and store in a local memory. The retailer may have created or programmed a user interface 130 which automatically retrieves the sales and delivery information from the local memory, and transmits the item information to the access portal 120. This can eliminate the need for a retailer to manually input the item and delivery information. The retailer may configure the user interface 130 to retrieve and transmit any variety of item data, such as sales data, in real-time, that is, as sales occur, or at specified intervals, such as hourly, twice a day, once a day, or any other desired interval.

Upon receiving the item information, process 200 moves to block 210 wherein the system 100 generates an electronic manifest and adds the item information to the electronic manifest. The electronic manifest is configured such that the data is easily obtained, manipulated, transmitted, and analyzed by the server 110, the item tracking module 150, and any other component of the system 100 or the distribution network at large.

The process 200 next moves to block 212, wherein the electronic manifest information is provided to the item tracking module 150. The electronic manifest information may be sent from the access portal 120 or the server 110 to the item tracking module 150, or, in some embodiments, the item tracking module 150 may be alerted to the creation of the electronic manifest and may retrieve the electronic manifest information.

The process 200 next moves to block 214 wherein a unique identifier is generated for the item based on the item information. As described elsewhere herein, the unique identifier may include or encode the unique identifier of the entity requesting manifesting, and may include or encode other information regarding the item. In some embodiments, the unique identifier has an expiration, that is, the unique identifier may be valid or recognized in the distribution network for a limited period of time, such as for 30 days. This allows the distribution network to identify items that have been in the distribution longer than expected, and allows for reuse of unique identifiers. The unique identifier is associated with the item information and stored in memory. The unique identifier is added to the electronic manifest.

The process 200 then moves to decision state 216, wherein it is determined whether further items are to be added to the manifest. If further items are to be added to the electronic manifest, the process returns to block 208, where item information for another item is received. If no further items are to be added, the process 200 moves to block 218 wherein the electronic manifest is completed.

Upon completing the electronic manifest, the process 200 moves to block 220 wherein payment is collected or requested. Payment may be requested via the user interface, wherein the user may authorize the payment module 160 to debit the entity's debit account or trust account. The entity may also request that payment be authorized or deducted from an account upon receipt of the item into the distribution network. Payment information may be associated with the electronic manifest. For example, the electronic manifest may be updated to indicate whether payment has been provided for a particular item. Upon receipt of the electronically manifested item in the distribution network, the distribution network, upon scanning or reading the item's unique identifier, the payment status for the item can be determined. In some embodiments, payment information can be collected upon completion of the manifesting process, and actual payment may occur at a later time. In some embodiments, the process 200 may request payment at any point during process 200, or upon receipt of the item into the distribution network.

Upon requesting payment, the process 200 moves to decision state 222, wherein the payment module 160 determines whether sufficient payment has been provided or received. For example, the payment module 160 may access the entity's debit or permit/trust account to determine if adequate payment is available. If adequate payment is not received, the process 200 returns to block 220 to await and/or request payment. If adequate payment is available, the process 200 moves to step 224, wherein label information is generated. In some embodiments, the labels can be generated at the time of the transaction, and the actual payment or debit for the transaction may occur at a later time.

The item tracking module 150 generates label information and provides the label information to the user interface 130 and/or to the output module 170. The label information may include the unique item identifier, sender information, destination information, special handling instructions, service class, etc. The item tracking module 150 may generate label information and provide the label information to the user interface 130. A user can then print a label using the output module 170, which can then be affixed to the item.

Upon generating the label information, process 200 moves to block 226, wherein the item tracking module 150 provides tracking data to the user interface 130. Once an item having the unique identifier generated by system 100 which is on the electronic manifest is received into the distribution network, the item tracking module 150 tracks and stores each handling event associated with the item having the unique identifier. A user can request tracking data via the user interface 130 using a variety of options. The user interface 130 and/or the access portal 120 may be configured to allow the entity or sender of the item may access the system and request information regarding all items in the distribution network associated with the entity's unique identifier. The entity may request the tracking data of each item on a particular manifest, of each item to be delivered on a certain day, of each item based on delivery area, or based on any other desired information. The process 200 next moves to block 228, wherein the process 200 ends.

Figure 3:
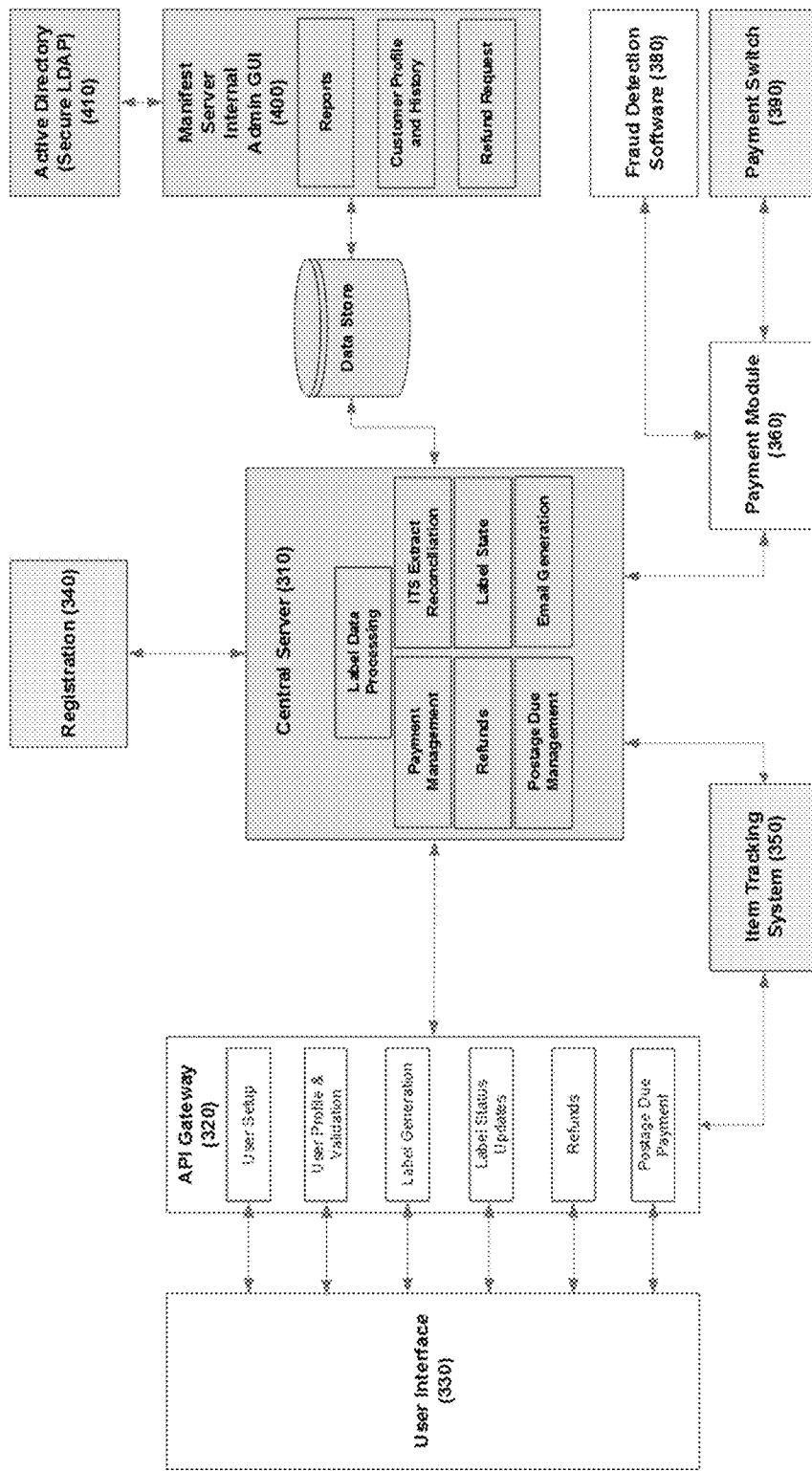
FIG. 3 is a block diagram of an embodiment of an electronic manifesting system.

FIG. 3 depicts a block diagram of another embodiment of an electronic manifesting system. As described elsewhere herein, the manifest application can serve as the backend application for a shipping fulfillment system, providing a mechanism for shippers to electronically manifest shipping information to USPS, pay for shipments through various means, track shipments and modify shipment instructions in route. In some embodiments, the manifest server application, through an API gateway, can offer the following functions for the UI consumption: customer setup, Customer credential validation and retrieval of profile information, Label/barcode creation and electronic manifest of label information to tracking system, ultimately resulting in postage payment, In route modifications to shipment information, Refunds and postage due payments, Label status (e.g. paid, refunded, postage due) updates.

The electronic manifesting system includes a central server 310, a data store 311, an API gateway 320, a user interface 330, a registration module 340, an item tracking system 350, a payment module 360, a fraud detection system 380, a payment switch 390, a manifest server interface 400 and an active directory 410. Some components depicted in FIG. 3 may be similar to those described elsewhere herein, including the central server 310, the memory or data store 311, the API gateway 320, the user interface 330, the registration module 340, the item tracking system 350, and the payment module 360.

The user interface 330 can communicate with the access portal and the central server 310 through a registration process. A user, via the API gateway 320 can create a manifest server label using the user interface 330. A user can login to the user interface 330 via registration credentials provided by the central server 310. After login, when a user identifies items for inclusion on a manifest, the user can add items to an electronic manifest using a variety of methods described elsewhere herein, including manual entry, automatic entry, from a sales system, an ordering system, and the like.

Once the manifest is created, the user can request labels for the manifested items be created. After all of the items for inclusion on an electronic manifest have been added, labels which have been generated can be communicated to the payment module 360 to transact payment. In some embodiments, payment can be obtained immediately, for items whose labels have not been printed but have been manifested, or can be obtained at a later specified time.

If a user manifests a set number of items and/or creates a threshold number of labels, the central server 310 may require a payment, at a payment due threshold. If the payment threshold is met, the API gateway can prevent the user from creating manifest server application labels until the payment due has been sufficiently paid. The API gateway 320 will offer functionality to allow for postage due payments and will prompt a customer for their Registration credentials prior to postage due payment. In some embodiments, the API gateway 320 can process refunds for labels generated, or manifested, but which are not physically provided to a distribution service.

The payment module 360 communicates with a payment switch 390 to complete payment transactions. The payment switch 390 can communicate with outside payment providers, such as banks, debit accounts, credit cards, and other payment sources. The payment module 360 also communicates with the fraud detection software to identify whether a user is attempting to fraudulently manifest items, generate fraudulent labels, or avoid payment. The fraud detection software 380 can be configured to require a PIN associated with a user or a valid MAC address related to the user interface 330. Where a fraudulent use is detected or suspected, the central server 310 can prevent users from manifesting items or generating labels.

The electronic manifesting server includes the manifest server interface 400. The manifest server interface 400 provides administrative tools for owners and/or operators of the electronic manifesting system to evaluate actions, perform maintenance, prepare reports, evaluate user/customer profiles and usage history, and the like.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the development should not be taken to imply that the terminology is being re-defined herein to be restricted to including any specific characteristics of the features or aspects of the technology with which that terminology is associated.

The technology is operational with numerous other general purpose or special purpose computing system environments or configurations. Examples of well-known computing systems, environments, and/or configurations that may be suitable for use with the development include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A microprocessor may be any conventional general purpose single- or multi-chip microprocessor such as a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

The system may be used in connection with various operating systems such as Linux®, UNIX® or Microsoft Windows®.

The system control may be written in any conventional programming language such as C, C++, BASIC, Pascal, or Java, and ran under a conventional operating system. C, C++, BASIC, Pascal, Java, and FORTRAN are industry standard programming languages for which many commercial compilers can be used to create executable code. The system control may also be written using interpreted languages such as Perl, Python or Ruby.

Those of skill will further recognize that the various illustrative logical blocks, modules, circuits, and algorithm steps described in connection with the embodiments disclosed herein may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the present development.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

As can be appreciated by one of ordinary skill in the art, each of the modules may comprise various sub-routines, procedures, definitional statements and macros. Each of the modules are typically separately compiled and linked into a single executable program. Therefore, the following description of each of the modules is used for convenience to describe the functionality of a preferred system. Thus, the processes that are undergone by each of the modules may be arbitrarily redistributed to one of the other modules, combined together in a single module, or made available in, for example, a shareable dynamic link library. Depending on the embodiment, certain modules may be removed, merged together, or rearranged in order. Also depending on the embodiment, certain steps of the methods may be added, rearranged, combined, or removed. If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the development should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present development. At the very least, and not as an attempt to limit the application of the doctrine of equivalents to the scope of the claims, each numerical parameter should be construed in light of the number of significant digits and ordinary rounding approaches.

The above description discloses several methods and materials of the present development. This development is susceptible to modifications in the methods and materials, as well as alterations in the fabrication methods and equipment. Such modifications will become apparent to those skilled in the art from a consideration of this disclosure or practice of the development disclosed herein. Consequently, it is not intended that this development be limited to the specific embodiments disclosed herein, but that it cover all modifications and alternatives coming within the true scope and spirit of the development as embodied in the attached claims.

What is claimed is:

1. A method of manifesting items comprising:
   sending a request, via a user interface, to access to an electronic manifesting system of a distribution network, wherein the request comprises a unique identifier associated with a user;
   receiving, via a user interface, access to an electronic manifesting system based at least in part on the unique identifier associated with a user;
   transmitting, via the user interface, to the distribution network, item information for a first item to the electronic manifesting system;
   receiving, via the user interface, from the distribution network, first label information, wherein the label information contains a first computer readable code, wherein the first computer readable code comprises the unique identifier associated with the user and a unique identifier specific to the first item;
   transmitting, via the user interface, to the distribution network, item information for a second item to the electronic manifesting system;
   receiving, via the user interface, from the distribution network, second label information, wherein the label information contains a second computer readable code, wherein the second computer readable code comprises the unique identifier associated with the user and a unique identifier specific to the second item; and
   providing, to the distribution network, the first item having the first computer readable code thereon and the second item having the second computer readable code thereon.

2. The method of claim 1 further comprising sending, via the user interface, the label information to an output device.

3. The method of claim 1 further comprising receiving, via the user interface, a payment request based on the item information.

4. The method of claim 3 further comprising, sending, via the user interface, payment information to the electronic manifesting system.

5. The method of claim 1 further comprising:
   sending, via the user interface, the unique identifier associated with the user; and
   receiving, via the user interface, tracking information for the first and second items item based on the unique identifier associated with the user.

6. A method of manifesting items comprising:
   receiving, at an electronic manifesting system associated with a distribution network, a unique identifier associated with a user;
   receiving, at an electronic manifesting system, item information associated with a plurality of items;
   generating, via the electronic manifesting system, a computer readable code for each of the plurality of items, the computer readable code comprising the unique identifier associated with the user and a unique identifier specific to an individual item of the plurality of items;
   associating, via the electronic manifesting system, the computer readable code for each of the plurality of items with the unique identifier associated with the user;
   creating, via the electronic manifesting system, an electronic manifest including the item information for the plurality of items and the user's unique identifier;
   generating, via the electronic manifesting system, label information including the associated computer readable codes for each of the plurality of items;
   receiving the plurality of items in the distribution network, the plurality of items comprising having the associated computer readable codes thereon; and
   after receiving the plurality of items in the distribution network, scanning the plurality of items.

7. The method of claim 6 further comprising sending, via the electronic manifesting system, the label information to an output device.

8. The method of claim 6 further comprising sending, via the electronic manifesting system, a payment request based on the item information.

9. The method of claim 8 further comprising, receiving, via the electronic manifesting system, payment information to the electronic manifesting system.

10. The method of claim 6 further comprising, transmitting, to a user interface, tracking information for an item associated with the unique identifier associated with a user.

11. An electronic manifest system configured to:
    receive a unique identifier associated with a user;
    receive item information associated with one or more items;
    generate a unique identifier for at least one of the one or more items, the unique identifier comprising the unique identifier associated with the user and a unique identifier specific to an individual item of the one or more items;

associate the unique identifier for the at least one of the one or more items with the unique identifier associated with the user;

create an electronic manifest associated with a distribution network including the item information for the one or more items and the unique identifier associated with the user;

generate label information including the unique identifier for the at least one or more of the items; and identify at least one of the one or more items having the unique identifier thereon being received into the distribution network.

12. The electronic manifest system of claim 11, further configured to send a payment request based on the item information.

13. The electronic manifest system of claim 12, further configured to receive payment information to the electronic manifesting system.

14. The electronic manifest system of claim 11, further configured to send, to a user interface, tracking information for an item associated with the unique identifier associated with a user.

15. A method of manifesting items comprising:
providing a user interface, the user interface providing access to a an electronic manifesting system associated with a distribution network;
receiving, in the electronic manifesting system, an access request to access the electronic manifesting system;
assigning, by the electronic manifesting system, a unique identifier to a user;
storing, by the electronic manifesting system, the unique identifier;
providing, by the electronic manifesting system, based on the access request, access to the electronic manifesting system;
generating, by the electronic manifesting system, an electronic manifest;
associating the electronic manifest with the assigned user's unique identifier;
receiving, via the electronic manifesting system, item information for a first item;

generating, by a processor, a unique identifier for the first item, the unique identifier for the first item comprising the user's unique identifier and a serial number specific to the first item;
adding, to the electronic manifest, the unique identifier for the first item and the item information for the first item;
after generating the electronic manifest, receiving, in the distribution network, the first item;
causing an output apparatus to automatically apply the unique identifier for the first item to the first item in response to receiving the unique identifier for the first item.

16. A system of manifesting items comprising:
a user interface configured to receive a user access request, and configured to provide electronic access to a server;
wherein the server comprises a processor which is configured to:
generate and store a unique identifier, the unique identifier associated with a user;
receive, from the user, item information for one or more items;
generate and store a unique identifier for at least one of the one or more items, the unique identifier comprising the unique identifier associated with the user and an identifier specific to one of the one or more items;
associate the unique identifier for the at least one of the one or more items with the unique identifier associated with the user;
generate an electronic manifest including the item information and the user's unique identifier; and
generate label information for the at least one of the items on the electronic manifest;
an item tracking apparatus configured to receive and process the at least one item in an item distribution network; and
an output apparatus configured to receive the label information and configured to automatically apply the unique identifier for the item to the at least one of the items in response to receiving the label information.

* * * * *

UNITED STATES PATENT AND TRADEMARK OFFICE
CERTIFICATE OF CORRECTION

PATENT NO. : 11,113,750 B2  
APPLICATION NO. : 16/353953  
DATED : September 7, 2021  
INVENTOR(S) : Robert E. Dixon et al.

Page 1 of 1

It is certified that error appears in the above-identified patent and that said Letters Patent is hereby corrected as shown below:

In the Claims

In Column 16, Claim 5, Line 18, delete "items item" and insert --item--.

In Column 16, Claim 6, Line 44, delete "thereon;" and insert --thereon:--.

In Column 17, Claim 15, Line 26 (Approx.), delete "a an" and insert --an--.

Signed and Sealed this  
Eighth Day of February, 2022

Drew Hirshfeld  
*Performing the Functions and Duties of the*  
*Under Secretary of Commerce for Intellectual Property and*  
*Director of the United States Patent and Trademark Office*